(12) United States Patent
Oosthoek

(10) Patent No.: US 11,694,582 B2
(45) Date of Patent: Jul. 4, 2023

(54) ELECTRONIC SHELF LABEL WITH INTERACTION INTERFACE

(71) Applicant: SES-IMAGOTAG GMBH, Fernitz-Mellach (AT)

(72) Inventor: Jan Oosthoek, Voitsberg (AT)

(73) Assignee: SES-IMAGOTAG GmbH, Ferniz-Mellech (AT)

( * ) Notice: Subject to any disclaimer, the term of this patent is extended or adjusted under 35 U.S.C. 154(b) by 70 days.

(21) Appl. No.: 17/422,182

(22) PCT Filed: Jan. 12, 2019

(86) PCT No.: PCT/EP2019/050724
§ 371 (c)(1),
(2) Date: Jul. 10, 2021

(87) PCT Pub. No.: WO2020/143925
PCT Pub. Date: Jul. 16, 2020

(65) Prior Publication Data
US 2022/0130284 A1    Apr. 28, 2022

(51) Int. Cl.
*G09F 3/20* (2006.01)
*G06F 3/0354* (2013.01)
*G06F 3/147* (2006.01)
*G09G 3/20* (2006.01)

(52) U.S. Cl.
CPC .......... *G09F 3/208* (2013.01); *G06F 3/03547* (2013.01); *G06F 3/147* (2013.01); *G09G 3/2096* (2013.01); *G06F 2203/0339* (2013.01); *G09G 2354/00* (2013.01); *G09G 2380/04* (2013.01)

(58) Field of Classification Search
CPC ...... G09F 3/208; G06F 3/03547; G06F 3/147; G06F 2203/0339; G09G 3/2096; G09G 2354/00; G09G 2380/04; G09G 3/20
See application file for complete search history.

(56) References Cited

U.S. PATENT DOCUMENTS

| | | | |
|---|---|---|---|
| 2015/0034719 A1* | 2/2015 | Wei ........................ | G06F 3/14 235/383 |
| 2016/0055562 A1* | 2/2016 | Kim ........................ | H04W 4/80 705/26.61 |
| 2019/0189041 A1* | 6/2019 | Ishizaki ................ | G06F 3/0416 |
| 2021/0026586 A1* | 1/2021 | Hu .......................... | G06F 21/31 |

* cited by examiner

*Primary Examiner* — Rodney Amadiz
(74) *Attorney, Agent, or Firm* — Dennemeyer & Associates, LLC

(57) ABSTRACT

An electronic shelf label that comprises: a display unit that is arranged to display an image, and an interaction interface which is arranged separate from the display unit, wherein the interaction interface is realized as touch sensitive unit that provides a touch-triggered signal, and a processing unit that is connected to the touch sensitive unit and is arranged to process the touch-triggered signal.

13 Claims, 4 Drawing Sheets

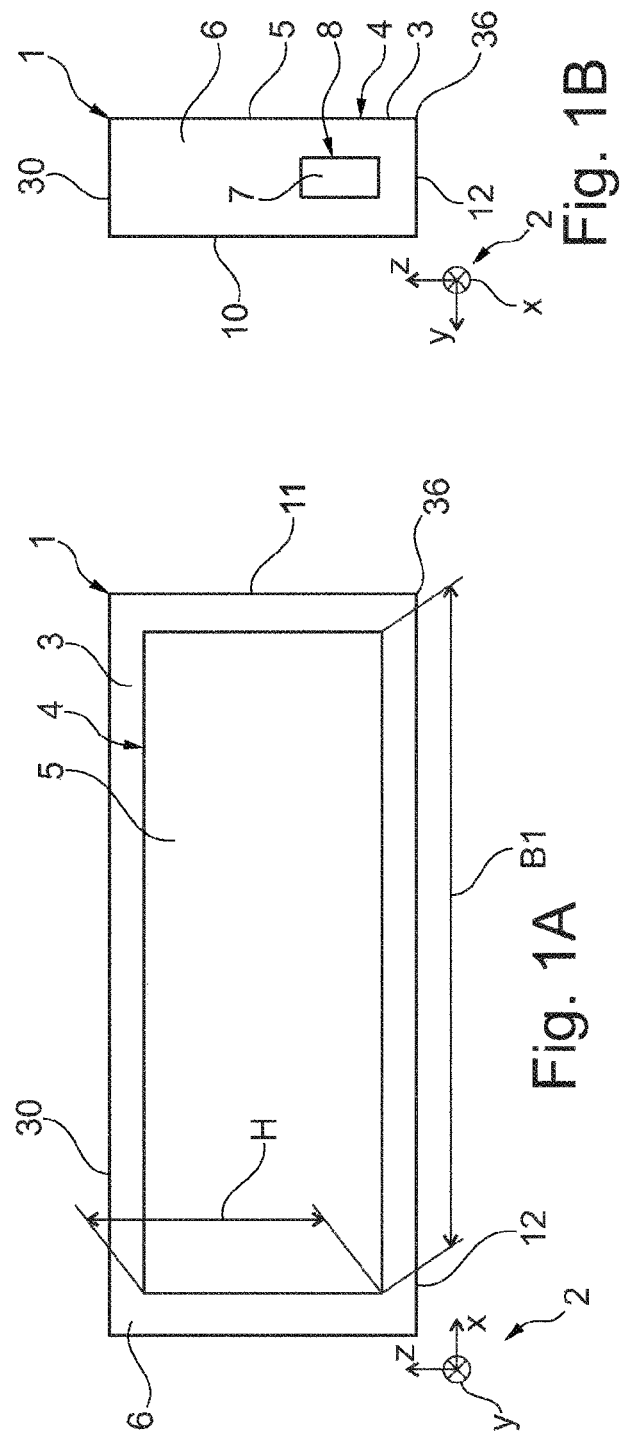
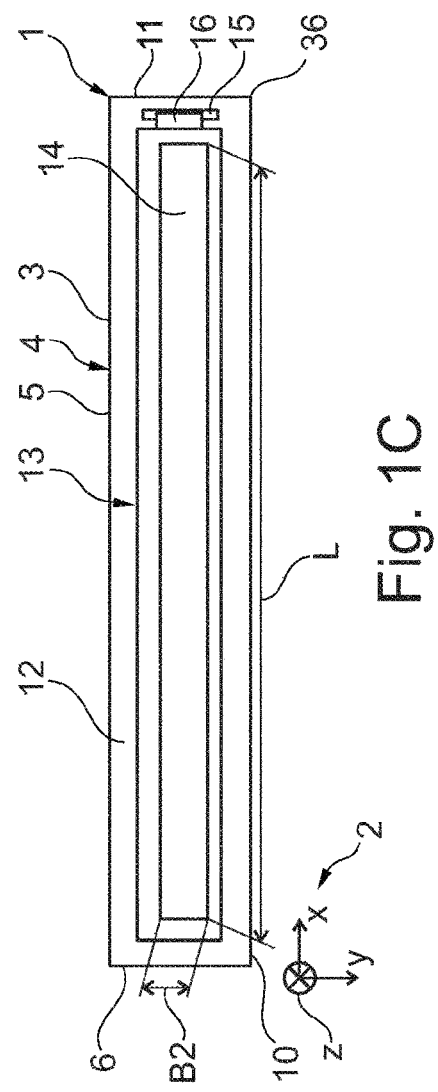

ELECTRONIC SHELF LABEL WITH INTERACTION INTERFACE

TECHNICAL FIELD

The invention relates to an electronic shelf label with interaction interface.

BACKGROUND

The international patent application published with publication number WO2017/097358A1 discloses an electronic shelf label with an interaction interface that can communicate with another electronic device by means of Near Field Communication (NFC) technology. The electronic device is a handheld barcode scanner which allows to link a product to a particular electronic shelf label. This is achieved by scanning the barcode on the product, which uniquely identifies the product, and by scanning the barcode displayed on the display of the electronic shelf label, which uniquely identifies the electronic shelf label. The acquired barcodes are then submitted to a central merchandizing server of a retail shop, where the link between the electronic shelf label and the product is digitally stored in a database. In the following the server supplies display data, which code product related information of the product linked with the electronic shelf label to the electronic shelf label and the display of the electronic shelf label displays the information in a human readable form.

The NFC interface of the electronic shelf label allows convenient interaction with the electronic shelf label as long as nowadays commonly applied handheld NFC-enabled barcode scanners are used. Ultimately, however, an external NFC-enabled device is always necessary, which can be a significant cost factor. Further to this, the implementation of features that enhance the user-interaction with the electronic shelf label is very difficult or even impossible.

Therefore, the object of the invention is to provide a cheaper alternative to the existing NEC-interface, which allows more feature rich applications while securing easier user interaction with the electronic shelf label.

SUMMARY OF THE INVENTION

This object is achieved by a system according to claim 1. Therefore, the subject matter of the invention is an electronic shelf label that comprises a display unit that is arranged to display an image, and
an interaction interface which is arranged separate from the display unit, wherein the interaction interface is realized as stripe-shaped touch sensitive unit that provides a touch-triggered signal, and a processing unit that is connected to the touch sensitive unit and is arranged to process the touch-triggered signal.

The measures according to the invention provide the advantage that a direct touch interaction at any position along the stripe-shaped touch sensitive unit directly at the electronic shelf label can be processed in order to e.g. influence the processing data or the operation mode or the image that is shown or played back by the display unit and so on. This eases the user interaction dramatically because no further handheld device to control the electronic device according to user interaction thereon is necessary any more.

Regarding this further handheld device used in the state of the art, that is omitted, it is to mention that in particular, any errors that may be caused by an incorrect operation or incorrect use of such handheld devices are completely avoided. Such errors may occur if in the use of e.g. NEC-enabled devices the distance between the handheld device and the electronic shelf is incorrect for NFC communication between the two. Also, the required duration of close proximity between the handheld device and the electronic shelf label may not be maintained long enough, which may lead to communication errors.

In addition to the strict avoidance of drawbacks known from the state of the art as explained, also new functions or features like for example direct positioning or directly establishing a logic link between a virtual label display by the display and a product are now easily possible.

Further to this, the localization of the stripe-shaped touch sensitive unit separate from the display device also has the advantage that the interaction with a user does not take place on the screen itself. Advantageously, the interaction does not take place in line of sight on the screen. The interaction takes place outside the line of sight. Thus, image contents are visible at any time during the interaction and the screen is not contaminated by touch.

Further to this, the stripe-shaped embodiment of the touch sensitive unit not only allows a detection of a point-by-point touch but also the detection of an areal or sliding touch along the stripe-shaped touch sensitive unit.

The measures according to the invention are of particular importance for a video rail electronic shelf label in which the display is a video screen that extends along the front face of the electronics shelf label. Presently developed video rail electronic shelf labels may have a certain width/length. Hence, each of such an electronic shelf label may cover a significant length of the front edge of the shelf floor. With this next generation electronic shelf labels product information is displayed on the screen by the aid of virtual labels which can be freely positioned within the display area of the display, preferably along the width of the display. The process of positioning a virtual label along the width of the display can now be easily achieved by the use of the stripe-shaped touch sensitive unit, but also other functionalities are possible as will be explained later.

As the stripe-shaped touch sensitive unit exists separate from the display, the display unit used can be a video display without touch screen functionality. Advantageously during the user interaction, the display does not get dirty because the display does not need to be touched at all. This of course is a significant advantage over the use of conventional touch screens in electronics shelf labels.

But also, the image quality of the image displayed with the display unit is enhanced when compared with conventional touch screens because the touch sensitive layer of conventional touch screen is avoided. Such a touch sensitive layer usually reduces the clarity of the display. Further to this, a non-touch-screen display is significantly cheaper as a touch screen display.

Finally, it must be highlighted that positioning of such virtual labels or using of further functionalities of the electronic shelf label is now possible without the use/need of any further/separate electronic device like a smart phone or special remote control. This eases the handling significantly but also reduces infrastructure costs.

Furthermore, remote positioning of the virtual electronic labels by means of a central server can be totally avoided or reduced to a rough positioning while fine tuning of the ultimate position of the virtual labels can be achieved by direct user interactions with the video rail electronic shelf label concerned.

Further particularly advantageous embodiments and extensions of the invention arise from the dependent claims and the following description. It should be noted that certain features of a claim category can be transferred with appropriate adaptation to the other categories and achieve the same effects there. Furthermore, it should be understood that the use of the phrase " . . . arranged to . . . " shall be understood to introduce a mechanical, structural, or a certain technical feature, technical feature formulated in a functional way, or also a technical design, e.g. realized by means of computer or electronics hardware, or even a software based feature in the context of a computer implemented invention, which is based on a program code that is executed on a programmable computer hardware in order to achieve a certain function or effect.

Preferably the stripe-shaped touch sensitive unit requires a certain minimum force to detect a touch of a user's finger or hand. Such minimum force may be in the range of 0,5 to 2 Newton. This prevents the misrecognition of movements, which sometimes is not intended as touch, by the user, as sometimes observed with touch-sensitive image screens. Overcoming the minimum force required to trigger the touch-triggered signal can also be interpreted by the processing unit as an acknowledgment or trigger for a processing operation.

The electronic shelf label comprises a housing which comprises the touch sensitive unit accessible from the outside for a human finger touch. This may be achieved by attaching it to the outside wall, if a slim shape for the stripe-shaped touch sensitive unit is used. If the stripe-shaped touch sensitive unit shows larger dimensions, it may also be of advantage to provide an opening in the housing for user finger interaction and to affix the stripe-shaped touch sensitive unit inside the housing.

The stripe-shaped touch sensitive unit may be located on the wall that comprises or hosts the display unit. This may be of advantage because it can be seen immediately. On the other hand, this positioning will reduce the surface area of the front wall that is usable for image display by the display unit. Therefore, it is of advantage that the stripe-shaped touch sensitive unit is localized on a wall of the housing that is different from that wall of the housing which hosts the display unit. In this configuration the entire area of the front wall (probably reduced by a frame) is usable for the image display. Positioning outside the front wall also hides the touch sensitive unit. This is of particular importance if only staff is intended to interact with the touch sensitive unit and normal customers should not perceive it at all.

In particular, if the electronic shelf label is installed as intended at a shelf (this would be normally on the front edge of a shelf floor), the wall that host the display unit is the front wall and that wall that hosts the touch sensitive unit is the bottom wall. In a typical retail store, a shelf carries shelf floors and the electronic shelf labels are attached to the shelf floors such that the customer who passes by along the shelf mainly perceives the front wall of the electronic shelf with the display unit on it. The bottom wall of the electronic shelf label is typically invisible for a customer passing along the shelf. Such a customer typically focuses on the products on the shelf and after the desired product was found on the information provided by the display unit located on the front edge of shelf floor. Therefore, the bottom wall forms a natural hiding place from the eyes of the normal customer. This knowledge is, moreover, independent of the size of the electronic shelf label.

However, the positioning at the bottom wall becomes even more important if the electronic shelf label is realized as so-called video rail, which is arranged to display video images by its display unit. Such a video rail may be of significant length, e.g. up to or even larger than 1 meter. They may be directly attached to a shelf floor or substitute the shelf rail. Typically, a number of such video rails are installed directly side by side along a shelf floor, so that no use of the side walls facing each other is possible.

Preferably, the stripe-shaped touch sensitive unit is attached to, preferably glued onto, the housing of the electronic shelf label, preferably placed into a recess of the housing, wherein the recess shows a depth that is similar to the height of the stripe-shaped touch sensitive unit. In all these embodiments, the housing will have a gap lit through which cables pass for electronic connection with the processing unit. The attachment on the outside of the housing may be achieved, for example by means of screws. However, if the stripe-shaped touch sensitive unit is slim and of light weight, gluing may be the preferred choice. Taking the aforementioned aspect of hiding it into account it is of advantage to foresee the recess into which such a slim stripe-shaped touch sensitive unit can be placed. With this measure, the surface of the stripe-shaped touch sensitive unit can run in the surface of the housing.

According to a preferred embodiment the stripe-shaped touch sensitive unit is a purely resistor based linear position sensor. Such a linear position sensor may be a passive device. It requires a separate operation voltage to deliver the touch-triggered signal.

The stripe-shaped touch sensitive unit comprises a touch sensitive area that shows a length, and the stripe-shaped touch sensitive unit is arranged to generate the touch-triggered signal in such a way that the touch-triggered signal represents the touch-position along the length of the touch sensitive area at which the touch happens or occurs. Such a stripe-shaped touch sensitive device is, for example, available from the company named "spectrasymbol" (see spectrasymbol.com) under the product name "SoftPot". This stripe-shaped touch sensitive device is a passive linear position sensor which is powered by the electronic shelf label via two pins and delivers the touch triggered signal via a third pin if the touch force exceeds a minimum force level of 1 Newton. The touch-triggered signal has a linear dependence on the touch position along the touch sensitive area. The stripe-shaped touch sensitive unit is available as a straight stripe having a height of approximately 0,5 mm which makes it perfectly suitable for the attachment along the bottom wall of the housing as explained above.

Typically, the display unit comprises an image reproduction area that shows a first width and a height. The image reproduction area is the active area of the display screen of the display unit. According to a preferred embodiment the length of the stripe-shaped touch sensitive area, which is used to generate the touch-triggered signal, runs in parallel with the first width of the image reproduction area. This configuration allows to precisely identify the position along the first width of the image reproduction area at which a user touched the stripe-shaped touch sensitive area.

According to one aspect of the invention the length of the touch sensitive area exceeds the first width of the image reproduction area. This is of advantage if beside the identification of the touch position within the first width of the image reproduction area another touch-position related information may be acquired. This may be a tap on the touch sensitive area (a finger touch) outside the first width of the image reproduction area which can be detected by its position and interpreted, for example, as confirmation input for an operation or a start trigger for an operation. If this is not demanded, it is of particular advantage that the length of the touch sensitive area is of essentially identical measure with the first width of the image reproduction area. However, also an embodiment in which the length of the touch sensitive area is shorter than the first width of the image reproduction area is possible.

In both cases (the length of the touch sensitive area is longer or shorter than the first width of the image reproduction area) it is of advantage that the processing unit is arranged to scale the position at which the touch took place onto a corresponding position along the first width of the image reproduction area. Here the processing unit establishes a relationship between the touch position and the position along the first width of the image reproduction area.

In order to provide a number of functionalities which enrich the operation of the electronic shelf label, it is of particular advantage that the processing unit is arranged to control the display unit in dependency on the touch-triggered signal. In fact, it enables a simple to handle user interface that does not require any other additional input devices beside the electronic shelf labels itself. The display screen of the display unit may be used to display certain information and the stripe-shaped touch-sensitive unit allows the user to efficiently interact, in particular provide interaction at certain positions along the first width of the image reproduction area. In operation, the display screen may, for example, display a menu bar along its bottom edge and the user may touch the touch sensitive area of the stripe-shaped touch sensitive unit at a certain position that corresponds to one of the menu items. In order to detect the menu item selection touch of a user, the processing unit may be arranged to accept only an exact coincidence of the touch position with the display zone of the menu item or, otherwise, the processing unit may accept a certain deviation therefrom. The processing unit may also be arranged to accept a touch within a certain area around the display zone of the menu item. As a consequence of this touch a function of the electronic shelf label is executed by the processing unit, that is associated with the menu item.

Given the fact that the electronic shelf label is intended to display virtual labels by its display screen, the exact positioning of such virtual labels is a typical challenge. In order to cope with this challenge, the processing unit is arranged to control the image-position, which is the position along the first width of the image reproduction area where the image is to be displayed, and wherein the image-position is defined by the received touch-triggered signal which represents the touch-position. In an application example the display screen may show a virtual label, which for example flashes to distinguish it from other virtual labels that were already positioned, and the user may tap at a certain position along the touch sensitive area. The processing unit then places the label exactly on the corresponding position on the screen and stops flashing. The virtual label is now positioned.

However, in a preferred embodiment the processing unit is arranged to change the image-position along the first width of the image reproduction area in accordance with a detected continuous change of the touch position. This allows a user to freely move an image, for example a virtual label, along the first width if the image reproduction area, while keeping the finger pressed on the touch sensitive area and moving it along the touch sensitive area. The last selected position of the image will be frozen as soon as the touch ends. The sliding movement of a user's finger along the touch sensitive area may be interpreted by the processing unit as absolute or relative position with regard to the position where the image is displayed within the image reproduction area. The interpretation as relative position may be of advantage for the usability as the user may perform the sliding movement anywhere along the touch sensitive area while the image is moved within the image reproduction area relative thereto around its initial position. But also, a scaling of a user's finger move along the touch sensitive area may be supported by the processing unit. This feature allows to transform a certain length of the movement of the finger into a different length of the movement of the virtual label. In this context a differentiation into a rough positioning and a precise positioning is possible. For example, in a first scaling operation the factor to transform the finger movement into a virtual label movement is larger than one and in the subsequent second scaling operation the factor to transform the finger movement into a virtual label movement is smaller than one. The two scaling operations may be separated by an interruption in the touch.

According to a further aspect of the invention also a control of operation modes may be implemented by the use of the stripe-shaped touch sensitive unit. In order to achieve this, it is of advantage that the processing unit is arranged to detect and to distinguish between a first touch-triggered signal and a second touch triggered signal, and to influence its operation mode accordingly. A first touch trigger signal may be a single touch event within a period of a certain first duration and a second touch triggered signal may be multi touch event within a period of a certain second duration. Such multi touch events may also be distinguished by the position at which the individual touch takes place or by the duration between the individual touches. This feature is of particular advantage because it avoids the need to display a menu item before an operation mode can be activated by a touch at a corresponding position. Such operation modes can simply be initiated by performing the appropriate multi touch. The knowledge of such touch sequences may be limited to dedicated individuals in the group of users/operators of a retail shop.

If said first touch-triggered signal is detected, the processing unit is arranged to perform a logic link creation mode in which it is arranged to create a logic link between a product and a pre-defined virtual label. In this mode the electronic shelf label displays at a certain position a virtual label. The staff of the retail shop places a certain product on the shelf at the position where the virtual label is displayed. Finally, the employee initiates a capture of a picture of the barcode or the product label of the product. The picture may be captured by a small camera that is installed, for example, on the shelf and that delivers the picture data to a retail shop server. Than the employee touches the touch sensitive unit at the position of the virtual label in a manner so that it creates the first touch triggered signal. The touch sequence that leads to the creation of the first touch-triggered signal may be three touches within three seconds. The first touch triggered signal is detected by the processing unit and a communication with the server is initiated by the processing unit so that the virtual label concerned is linked to the product placed at the position of the virtual label. Now the digital link between the virtual label concerned and the product concerned is stored in the planogram of the shop.

If said second touch-triggered signal is detected, the processing unit is arranged to perform a position definition mode, in which it is arranged to define the position of a virtual label within the image reproduction area. Similar to the above said, for example, a touch sequence of two touch detections within two seconds at a positional or within a certain range of position along the touch sensitive unit may be used to define the position of a virtual label according to the position or within said range of position at which the touch sequence was detected. Also, this information may be communicated to the server and stored in the planogram of the retail shop.

Further to this, various other operation modes may be initiated by the detection of a predefined touch triggered signal sequences.

It should generally be mentioned that the processing unit can also be arranged to reprocess the signals which can be picked up by the sensor, similar to those of a computer mouse. Here, a single touch within a short period of time is interpreted as a single mouse click. A double touch within a short period of time is interpreted as a double mouse click. And a persistent touch with change in position is interpreted as a movement of the mouse pointer. With this simple feature set, for example, one can activate a function for positioning a virtual label (single mouse click), change the position of the virtual label along the first width of the screen (movement of the mouse pointer), and finally freeze the final position of the virtual label (double mouse click).

The electronic shelf label may also comprise an NFC interface, which can be used to activate the processing of the touch-triggered signals. An activation device may be a normal NFC-enabled mobile phone, which provides an activation code or command via its NFC-interface to the electronic shelf label. The mobile phone is operated by an employee of the retail shop.

This, for example, allows to enter in an employee mode which for example comprises a replenishment mode or store keeping mode, if the shelf is empty or needs to be refilled. After NFC-based activation the electronic shelf label displays a product description and a virtual label. This information is all pre-prepared in the office of the retail shop and provided by the retail shop server.

An employee who looks after the shelf can now position the virtual label or even double the displayed virtual label with a double-click and also position the second label. Leaving the finger in a certain position for a certain time can open a menu that is displayed horizontally along the first width of the screen. A double touch of the menu item "Out of Stock" leads to the option to delete the virtual label for this shelf. This can be confirmed by a double touch, and so on. With a triple touch of the touch sensitive area the employee mode is terminated.

The electronic shelf may also comprise a customer mode, which is active as long as the employee mode is not activated. In this customer mode a customer may touch the touch sensitive area at the position of a virtual label and the display may for example show further detailed information of the product linked with the respective virtual label. The display of such additional information may automatically fade away after a predefined period.

The features of the invention, in particular those realized by the display unit or the processing unit, may be realized by means of pure hardware or by means of programmable hardware on which a software is executed, e.g. microprocessors, microcontrollers or application specific circuits with input/output devices and memory devices to store the software and/or operational data are to be considered etc.

Finally, a merchandizing system is disclosed, which comprises a shelf that comprises a number of shelf floors to which the electronic shelf labels according to the invention are attached. In summary the use of a stripe-shaped touch sensitive unit in the electronic shelf label as discussed above leads to the advantages mentioned.

These and other aspects of the invention are obtained from the figures discussed below.

BRIEF DESCRIPTION OF THE FIGURES

The invention is explained again hereafter with reference to the attached figures and on the basis of exemplary embodiments, which nevertheless do not limit the scope of the invention. In the different figures the same components are labelled with identical reference numbers. They show in schematic fashion in:

FIG. 1A-1C an electronic shelf label visualized in three different perspectives;

DESCRIPTION OF THE EXEMPLARY EMBODIMENTS

Figure 2:
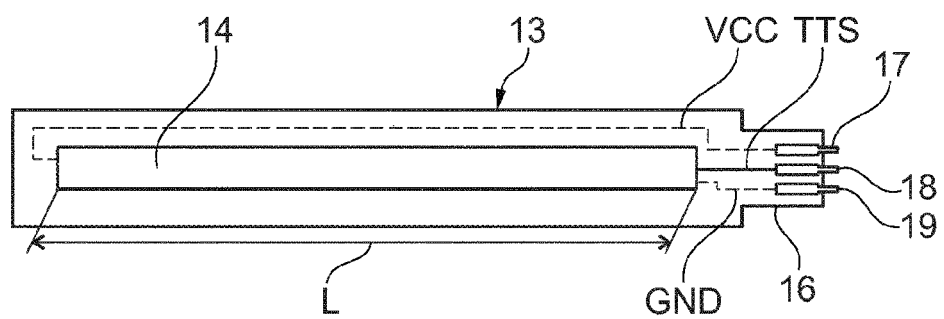
FIG. 2 a structure of a stripe-shaped touch sensitive unit.

FIG. 1A-1C visualizes an electronic shelf label 1, in the following abbreviated as ESL 1, in three different views. Each of the FIGS. 1A-1C shows a different side of the ESL 1, in particular of its housing 36. Its housing walls are aligned with the planes of a cartesian coordinate system 2.

FIG. 1A shows a front wall 3 with a display unit 4 of which only a frameless image reproduction area 5, in the following abbreviated screen 5, is visible. The screen shows a first width B1 and a height H. The y-axis of the coordinate system 2 points into the drawing surface.

The display unit 4 comprises beside the screen 5 the entire electronics required to display a still image or a video image.

FIG. 1B shows a left side wall 6 of the ESL 1 and a connection arrangement 7 of an interface 8, wherein the connection arrangement 7 is visible on the outside of the left side wall 6. The x-axis of the coordinate system 2 points into the drawing surface.

The connection arrangement 7 is arranged to be connected to a wire based combined power supply and signal/data bus 9 (see FIG. 7) in order to supply the ESL 1 with electrical power and to exchange data or signals with other devices. Dependent on the specific requirements of a customer the connection arrangement 7 may also be located on a rear wall 10 of the ESL 1. This eases direct connection with a corresponding connection arrangement of a shelf or shelf rail to which the ESL 1 is attached. The connection arrangement 7 may also be arranged in two parts, wherein on part of it is located on the left side wall 6 and the other part of it may be located on a right side wall 11 of the ESL 1. This allows to connect a number of ESLs 1 in a daisy chain configuration, while the rear wall 10 remains free accessible for a mechanical attachment to said shelf floor or shelf rail. The interface 8 comprises beside the described connection arrangement 7 the entire electronics required to receive electrical power and to exchange data or signals. Here it is to mention that the interface 8 may also be arranged to supply power to the electronics of the ESL 1 by means of wires/cables and to exchange data/signals in a wireless manner.

FIG. 1C shows a bottom wall 12 of the ESL 1 on which a stripe-shaped touch sensitive unit 13, in the following abbreviated as unit 13, is attached by glue. To be precise, it shows the outer shape of the unit 13, its touch-sensitive area 14 which has a length L and a second width B2. The length L is equal to the first width B1. Further to this the bottom wall 12 also shows a gap-shaped (slit-shaped/slot-shaped) opening 15 trough which a connection part 16 of the unit 13 is fed into the inside of the casing of the ESL 1 where it is connected with the electronics of the ESL 1. However, the gap-shaped opening may also be located on one if the side walls or the rear wall 10 of the ESL 1

The total length L may be in the range of 1 meter. The implies that the first width B1 of the screen 5 is of similar or identical width. The second width B2 may be in the order of 7 millimetres. The total width of the unit 13 may be around 20 millimetres. This implies that the bottom wall 12 may have a slightly larger width of approximately 30 millimetres. The unit 13 may be very slim, for example only 0,5 millimetres.

The z-axis of the coordinate system 2 points into the drawing surface.

Figure 3:
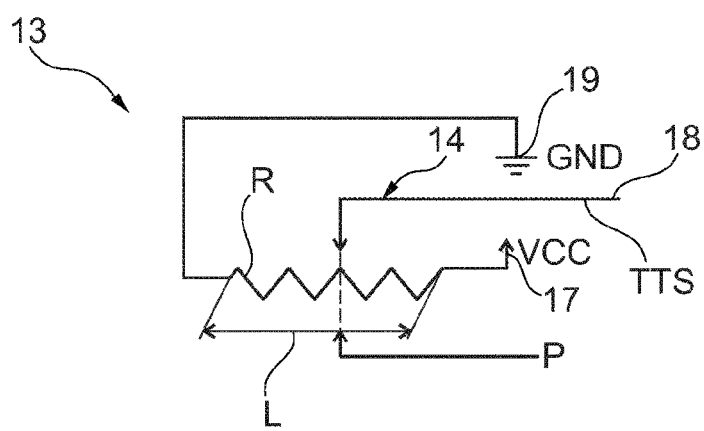
FIG. 3 an electronic scheme of the stripe shaped touch sensitive unit.

FIG. 2 in conjunction with FIG. 3 show some more details of the structure and the electronics of the unit 13. In particular, the connection part 16 comprises a first connection pin 17, a second connection pin 18, and a third connection pin 19. The unit 13 is a purely resistor based linear sensor that delivers a touch-triggered signal TTS at its pin 18 if it is touched with a minimum force of 1 Newton within its touch sensitive area 14 at a certain touch-position P (see FIG. 3), wherein the touch-triggered signal TTS or more precisely its value represents the touch-position P along the length L of the touch sensitive area 14 at which the touch happens or occurs. This is achieved by the electronics according to the electronical scheme shown in the FIG. 3. The unit 13 comprises along its touch sensitive area 14 a resistor R which is connected between the pins 17 and 19. The pin 17 is connected with an operation voltage VCC and pin 19 is connected with a reference potential GND of this operation voltage VCC. The inside of the touch sensitive area 14 is a conductor that is arranged to rest in a distance away from the resistor R if no force is applied to the touch sensitive area 14. It is connected with the pin 18. If a part of the touch sensitive area 14 is now pressed against the resistor R at a certain touch position P the voltage measured at that touch position P against the reference potential GND is picked up from there and available at the pin 18. For the avoidance of doubt, it is clarified herewith that the reference potential GND is also the reference potential of the electronics of the ESL 1. For example, the value of the operation voltage VCC may be 3 Volts and the value of the resistor R may be 20 k Ohm. This defines a current through the resistor which leads to a certain value of the voltage measured along the length of the resistor R against the reference potential GND. In other words, the voltage drop against the reference potential GND is proportional (linear) to the touch position P along the resistor R.

If the touch-position P is changed while the minimum force is maintained, the voltage value that can be measured at pin 18 varies accordance of the change of the touch-position P.

Figure 4:
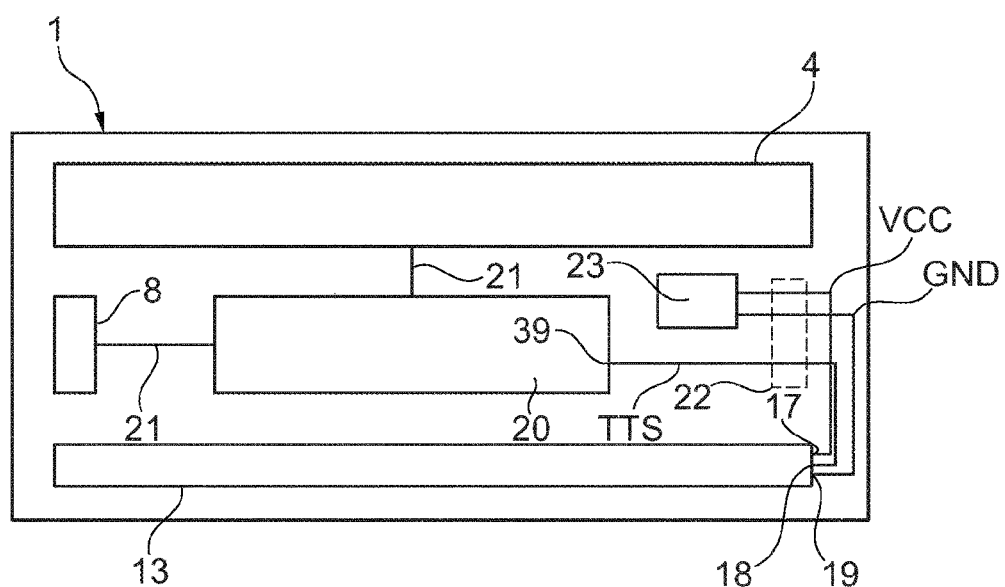
FIG. 4 a block diagram of the electronics of an electronic shelf label.

FIG. 4 now shows the interaction of the unit 13 into the ESL 1 in form of a block diagram of the electronics of the ESL 1. The ESL 1 comprises beside the already mentioned components also a processing unit 20, which is connected via a bus-system 21 to the display unit 4 and the interface 8. The electrical circuit board (not show in the FIG. 4) of the ESL 1 also comprises a connector 22 to connect with the pins 17-19. An operation voltage supply unit 23 supplies the operation voltage VCC and is connected with the pins 17 and 19. The operation voltage unit 23 may also be used to power the entire electronics of the ESL 1. It may receive electrical power from an external power supply (see FIG. 7, reference sign 38). The pin 18 is connected with an analogue to digital converter input 39 of the processing unit 20, which comprises an analogue to digital converter. The processing unit 20 is arranged to sample the touch triggered signal TTS and to compute the value of the sensed voltage and to provide certain functionalities which depend on the absolute value or the temporal change of the touch-triggered signal TTS or on the temporal sequences detectable in the touch-triggered signal TTS. Examples of this are shown in the following FIGS. 5 and 6.

Figure 5:
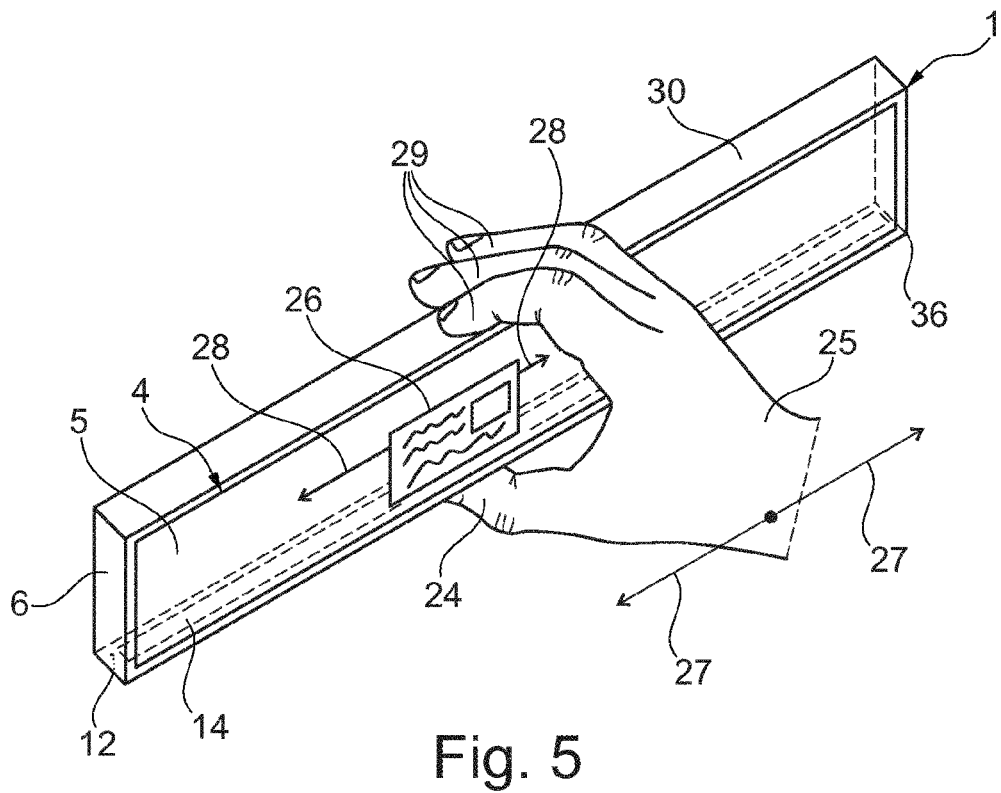
FIGS. 5-6 the electronic shelf label in operation.

The FIG. 5 shows the interaction of a user (not shown) with the ESL 1 which is operated in a virtual label positioning mode. In particular it shows the interaction of a user's hand 25 with the unit 13. Here the thumb 24 of the hand 25 touches the touch sensitive area 14 of the unit 13 with the required minimum force corresponding to the position of a virtual label 26 displayed on the screen 5. Than the user's hand 25 moves along the ESL 1 (visualized by first arrows 27) while the thumb 24 is continuously pressed against the touch sensitive area 14 with a force beyond the minimum force. During this interaction a temporal change in the value of the touch-triggered signal TTS occurs and this change is detected and processed by the processing unit 20 such that the position of the virtual label 26 moves on the screen 5 (see second arrows 28) in correspondence to the movement of the thumb 24 along the length L of the touch sensitive area 14. Advantageously the utilization of the thumb 24 during the interaction allows the user's others fingers 29 to support the hand 25 on an upper housing wall 30 of the ESL 1.

Figure 6:
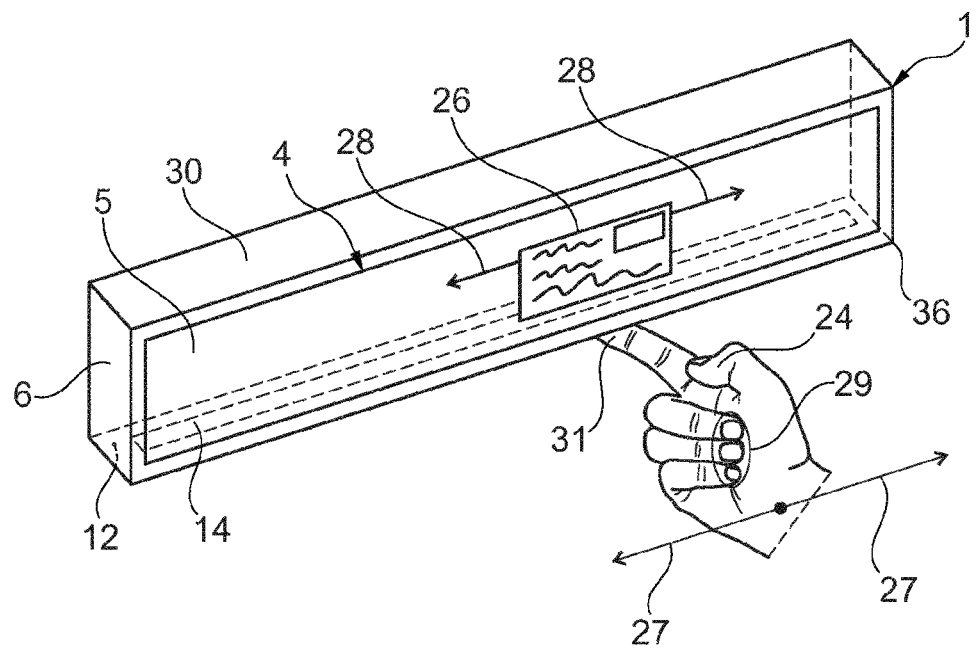

The FIG. 6 shows a further way of interaction with the touch sensitive area 14. Here only a pull finger 31 of the user's hand 25 is used to touch the touch sensitive area 14 with the required minimum force to generate the touch-triggered signal TTS. Again, the position of the virtual label 26 is changed in accordance with the movement of the pull finger 31 along the length L of the touch sensitive are 14.

Figure 7:
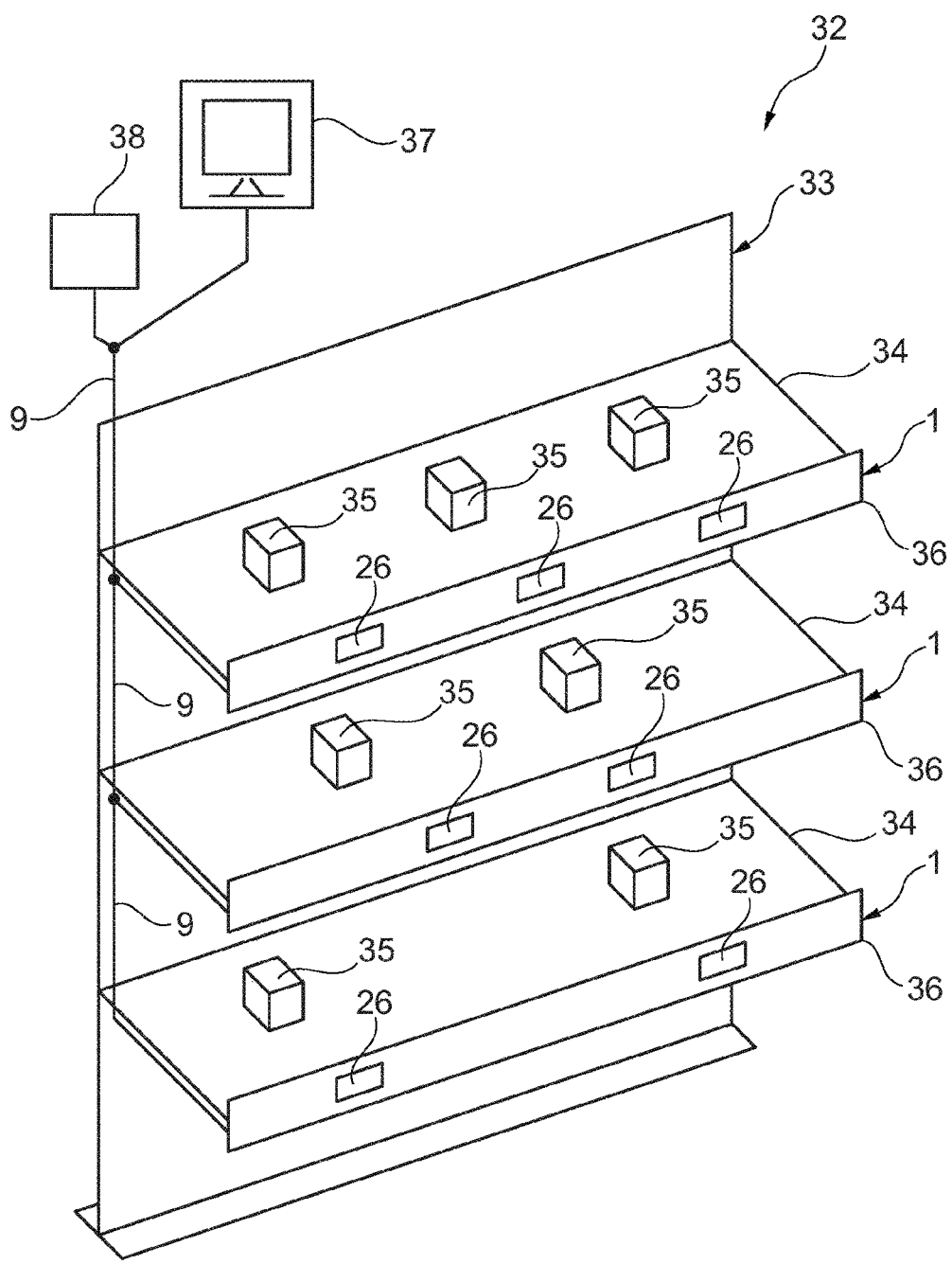
FIG. 7 an electronic shelf label system.

FIG. 7 shows an ESL system 32 which comprises a number of ESLs 1 installed on a shelf 33. Here the ESLs 1 realize a video rail which extends along the entire width of each shelf floor 34. The ESLs 1 are used to display a background colour or a background still image for each different shelf floor 34 or to display a background video either individually for each, shelf floor 34 or a single background video split in stripes of which each stripe is displayed on a different ESL 1. Details of the background image display are not shown in FIG. 7. In addition, each ESL 1 displays virtual labels 26 that are positioned along the length of each ESL 1 in correspondence the position of products 35 placed on the respective shelf floor 34.

The positioning of the individual ESLs 1 was performed according to the details explained in the general description and in particular during the positioning operation mode as explained in connection with the FIGS. 5 and 6.

The virtual labels 26 are generated by a server 37 that also stores the planogram of the retail shop where the ESL system 32 is operated. The ESLs 1 are connected with the combined power supply and signal/data bus 9 to the server 37 and a power supply station 38 that supplies the electric power for the operation of the ESLs 1.

Finally, it is mentioned that also a number of ESLs 1 can be installed in a daisy chain configuration along a shelf floor 34 or a number of horizontally neighbouring shelf floors 34 (not shown).

Finally, let it be noted once again that the figures described in detail above only involve exemplary embodiments, which the expert can modify in a wide variety of ways without departing from the area of the invention. For the sake of completeness, let it also be stated that use of the indeterminate article "a" or "an" does not mean that the respective features cannot be present multiple times.

The invention claimed is:

1. An electronic shelf label (1) that comprises:
a display unit (4) that is arranged to display an image, and
an interaction interface which is arranged separate from the display unit (4), wherein the interaction interface is realized as stripe-shaped touch sensitive unit (13) that provides a touch-triggered signal (TTS), and
a processing unit (20) that is connected to the touch sensitive unit (13) and is arranged to process the touch-triggered signal (TTS), the electronic shelf label (1) further comprising a housing (36) which comprises the touch sensitive unit (13) accessible from the outside for a human finger (24, 31) touch, and wherein the touch sensitive unit (13) is localized on a wall (12) of the housing (36) that is different from that wall of the housing (36) which hosts the display unit (4).

2. The electronic shelf label (1) according to claim 1, wherein, if the electronic shelf label (1) is installed as intended at a shelf (33), the wall that hosts the display unit (4) is the front wall (3) and that wall that hosts the touch sensitive unit (13) is the bottom wall (12).

3. The electronic shelf label (1) according to claim 1, wherein the touch sensitive unit (13) is attached to, preferably glued onto, the housing (36) of the electronic shelf label (1), preferably placed into a recess of the housing (36), wherein the recess shows a depth that is similar to the height of the touch sensitive unit (13).

4. The electronic shelf label (1) according to claim 1, wherein the touch sensitive unit (13) is a purely resistor based linear position sensor.

5. The electronic shelf label (1) according to claim 1, wherein
the touch sensitive unit (13) comprises a touch sensitive area (14) that shows a length (L), and
the touch sensitive unit (13) is arranged to generate the touch-triggered signal (ITS) in such a way that the touch-triggered signal (TTS) represents the touch-position (P) along the length (L) of the touch sensitive area (14) at which the touch happens or occurs.

6. The electronic shelf label (1) according to claim 1, wherein
the display unit (4) comprises an image reproduction area (5) that shows a first width (B1), and
the length (L) of the touch sensitive area (14) runs in parallel with the first width (B1) of the image reproduction area (5).

7. The electronic shelf label (1) according to claim 6, wherein the length (L) of the touch sensitive area (14) exceeds the first width (B1) of the image reproduction area (5) or is of essentially identical measure.

8. The electronic shelf label (1) according to claim 1, wherein the processing unit (20) is arranged to control the display unit (4) in dependency on the touch-triggered signal (TTS).

9. The electronic shelf label (1) according to claim 8, wherein
the processing unit (20) is arranged to control the image-position, which is the position along the first width (B1) of the image reproduction area (5) where the image is to be displayed, and wherein
the image-position is defined by the received touch-triggered signal (TTS) which represents the touch-position (P).

10. The electronic shelf label (1) according to claim 1, wherein the processing unit (20) is arranged to change the image-position along the first width of the image reproduction area (5) in accordance with a detected continuous change of the touch-position (P).

11. The electronic shelf label (1) according to claim 1, wherein the processing unit (20) is arranged
to detect and to distinguish between a first touch-triggered signal (TTS) and a second touch triggered signal (TTS), and
to influence its operation mode accordingly.

12. The electronic shelf label (1) according to claim 11, wherein, if said first touch-triggered signal (TTS) is detected, the processing unit is arranged to perform a logic link creation mode in which it is arranged to create a logic link between a product and a pre-defined virtual label (26).

13. The electronic shelf label (1) according to claim 11, wherein, if said second touch-triggered signal (TTS) is detected, the processing unit (20) is arranged to perform a position definition mode, in which it is arranged to define the position of a virtual label (26) within the image reproduction area.

* * * * *